(12) United States Patent
Johansson et al.

(10) Patent No.: US 8,842,672 B2
(45) Date of Patent: Sep. 23, 2014

(54) SYSTEMS AND METHODS FOR MODIFYING NETWORK PACKETS TO USE UNRECOGNIZED HEADERS/FIELDS FOR PACKET CLASSIFICATION AND FORWARDING

(75) Inventors: Stefan Johansson, Round Rock, TX (US); Keith E. Cheney, Austin, TX (US); Patricia A. Abkowitz, Austin, TX (US); Shardendu Pandey, Cedar Park, TX (US); Gregory S. Hilton, Austin, TX (US)

(73) Assignee: Anue Systems, Inc., Austin, TX (US)

( * ) Notice: Subject to any disclaimer, the term of this patent is extended or adjusted under 35 U.S.C. 154(b) by 79 days.

(21) Appl. No.: 13/432,172

(22) Filed: Mar. 28, 2012

(65) Prior Publication Data

US 2013/0259045 A1    Oct. 3, 2013

(51) Int. Cl.
*H04L 12/56* (2006.01)

(52) U.S. Cl.
USPC ........... 370/392; 370/401; 370/400; 370/389; 370/235

(58) Field of Classification Search
USPC ......................................................... 370/392
See application file for complete search history.

(56) References Cited

U.S. PATENT DOCUMENTS

| | | | | |
|---|---|---|---|---|
| 7,032,029 B1 * | 4/2006 | Tanzman et al. | ............... | 709/245 |
| 7,116,681 B1 | 10/2006 | Hovell et al. | ................. | 370/466 |
| 7,304,996 B1 * | 12/2007 | Swenson et al. | ............. | 370/394 |
| 7,453,874 B1 * | 11/2008 | Nguyen | ........................ | 370/389 |
| 7,561,574 B2 | 7/2009 | Gassoway | ..................... | 370/392 |
| 7,609,691 B2 | 10/2009 | Hain et al. | ..................... | 370/389 |
| 7,633,921 B2 | 12/2009 | Thubert et al. | ................ | 370/338 |
| 7,706,316 B1 * | 4/2010 | Kuik | .............................. | 370/320 |
| 7,865,944 B1 | 1/2011 | Shu et al. | ......................... | 726/11 |
| 8,072,919 B2 * | 12/2011 | Jiang et al. | ..................... | 370/320 |
| 2005/0128951 A1 * | 6/2005 | Chawla et al. | ................ | 370/235 |
| 2006/0221967 A1 * | 10/2006 | Narayan et al. | ............... | 370/392 |
| 2006/0256720 A1 * | 11/2006 | Curran-Gray et al. | ........ | 370/235 |
| 2007/0283024 A1 * | 12/2007 | Landrum et al. | ............. | 709/228 |
| 2007/0286204 A1 | 12/2007 | Ould-Brahim | ............. | 370/395.5 |
| 2008/0117895 A1 | 5/2008 | De Heer | ......................... | 370/389 |
| 2008/0304476 A1 | 12/2008 | Pirbhai et al. | ................. | 370/356 |
| 2009/0016336 A1 * | 1/2009 | LaVigne et al. | .............. | 370/389 |
| 2011/0261812 A1 * | 10/2011 | Kini et al. | ...................... | 370/389 |
| 2013/0259045 A1 * | 10/2013 | Johansson et al. | ............ | 370/392 |

OTHER PUBLICATIONS

Search Report/Written Opinion, PCT/US2013/028169, Feb. 28, 2013, (May 3, 2013), 10 pgs.

* cited by examiner

*Primary Examiner* — Ian N Moore
*Assistant Examiner* — Lakeram Jangbahadur
(74) *Attorney, Agent, or Firm* — Egan, Peterman & Enders LLP

(57) ABSTRACT

Systems and methods are disclosed for modifying network packets to use unrecognized headers/fields for packet classification and forwarding in packet processing systems, such as network tool optimizer (NTO) devices. The packet modifications described allow standard switch or routing integrated circuits (ICs) to process, classify, and forward packets based upon data that is not typically recognized by the hardware capabilities of the standard packet routing circuitry for packet processing. Input packets are modified so that unrecognized data becomes recognized data for purposes of packet processing, classification, and forwarding by the packet routing circuitry. These modifications are then removed after packets are processed to reform the original packets. The original packets are then provided to destination devices based upon packet classification and forwarding control information. As such, packet processing, classification, and forwarding is provided in packet processing systems using headers/fields that are not supported for processing by standard switch or routing integrated circuits (ICs).

30 Claims, 8 Drawing Sheets

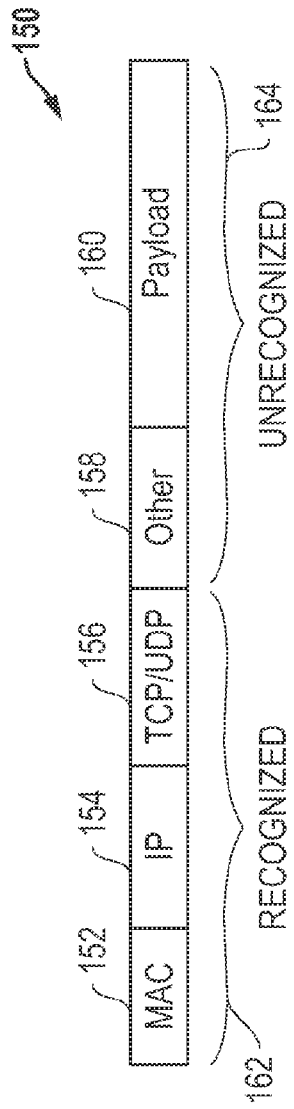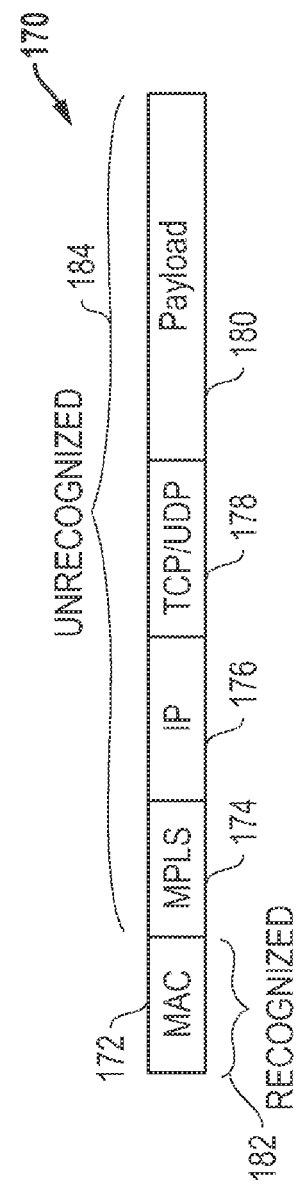
FIG. 1B (Prior Art)
FIG. 1C (Prior Art)

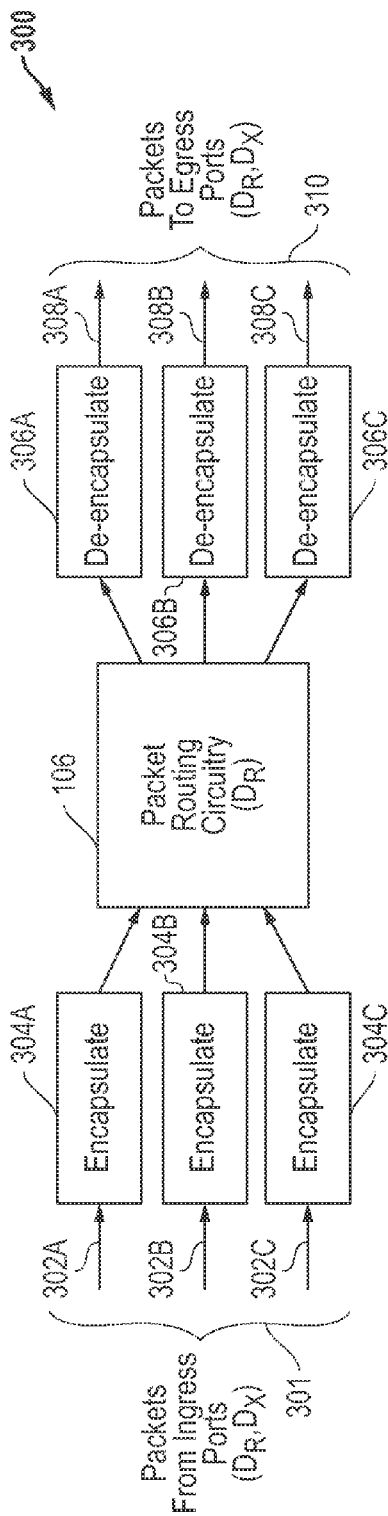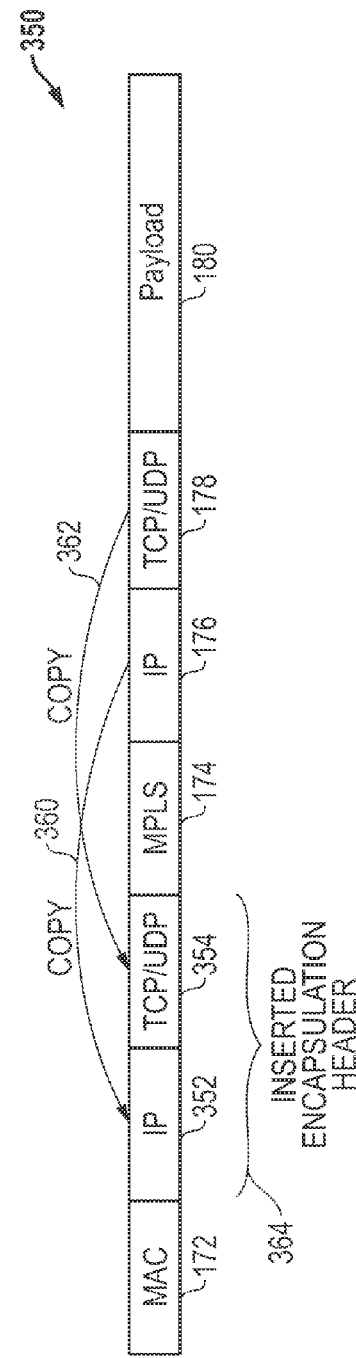

SYSTEMS AND METHODS FOR MODIFYING NETWORK PACKETS TO USE UNRECOGNIZED HEADERS/FIELDS FOR PACKET CLASSIFICATION AND FORWARDING

TECHNICAL FIELD OF THE INVENTION

This invention relates to processing network packets and, more particularly, to processing and forwarding network packets within network tool optimizers based upon packet contents.

BACKGROUND

Many network tool optimizers, as well as other network devices, utilize standard network routing or switch integrated circuits (ICs) to implement portions of their capabilities. These integrated circuits are able to forward network packets from an ingress port to one or more egress ports based upon information contained within the headers for packets entering the system through the ingress port. The ability to forward packets based upon header information, however, is limited by the characteristics and implementation of the particular network switching or routing IC device being used by the network tool optimizer device. These limitations, for example, make it possible to forward packets based only upon specific fields in the packet header that are recognized by the integrated circuit. Typically, recognized packet header information is limited to Ethernet header information, IP header information, and network layer four (L4) port information. Extremely limited capabilities currently exist in these standard network switching or routing ICs to utilize other fields.

Many packet processing systems, such as Ethernet switch integrated circuits (ICs), routers, and other packet processing systems can classify a packet based upon information in network layer two (L2—data link layer), layer three (L3—network layer) or layer four (L4—transport layer). This L2-L4 network layer information includes MAC (Media Access Control) headers, IP (Internet Protocol) headers and UDP/TCP (User Datagram Protocol/Transmission Control Protocol) port numbers. The processing of this L2-L4 information is typically obtained by extracting address bits from the packet headers and comparing them to a programmable bit mask, for example, using TCAM (ternary content addressable memory) circuitry within the network routing ICs.

In some circumstances, however, it is desirable to classify and forward packets based upon headers or fields that are not supported by the processing capabilities of standard network routing IC packet processors. For example, there may be a need to utilize an address within an IP header inside MPLS (Multi-Protocol Label Switching) tagged packets to classify packets for packet routing and forwarding purposes. There may also be a need to obtain the TEID (Tunnel Endpoint Identifier) in GTP tagged packets to classify packets for packet routing and forwarding purposes. GTP is a GPRS (general packet radio service) tunneling protocol. Standard Ethernet network routing ICs, however, do not have the capability of processing and forwarding packets based upon this information within MPLS or GTP tagged packets. Rather, this information is ignored by these standard network routing ICs. Further, classification and forwarding may also be desired using other information within a packet for which packet processing is not supported by the hardware capabilities of standard network routing ICs.

FIG. 1A (Prior Art) is a block diagram for an embodiment 100 for a prior system that utilizes standard packet routing circuitry 106 to process, classify, and forward packets. As depicted, a network tool optimizer (NTO) device 102 includes packet processing circuitry 105, which in turn includes packet processing controller 104 and packet routing circuitry 106. Packet routing circuitry 106 is implemented using standard network IC packet processors that are configured to support packet processing of packets using data from certain recognized headers or fields within packets formatted using a standard set of packet protocols. This standard set of packet protocols typically includes, for example, Ethernet protocols and internet protocols, such as IPv4 and IPv6. The packet routing circuitry 106 is typically configured to recognize data from certain headers/fields within these standard packet protocols (e.g., MAC headers, IP address fields) and to use this recognized data ($D_R$) to classify the packets and to determine how the packets are forwarded from input (or ingress) ports to output (or egress) ports within the NTO device 102. Other headers/fields within input packets are not recognized by the packet routing circuitry 106 for purposes of packet classification and forwarding. As such, the packet routing circuitry 106 is not able to use this unrecognized data ($D_X$) for classifying and forwarding the input packets.

As depicted in FIG. 1A (Prior Art), the NTO device 102 receives input packets 110 from source devices 108, and these input packets 110 can be formatted using various packet protocols. These input packets 110 are provided to one or more input ports 111 for the NTO device 102 and are then processed and classified by the packet routing circuitry 106. Based upon this processing and classification, the input packets are forwarded to one or more output ports 119 for the NTO device 102 according to packet classification and forwarding control information provided by packet processing controller 104. The output packets 120 are then provided to one or more destination devices 120. As described above, the input packets 110 will include both recognized data ($D_R$) and unrecognized data ($D_X$) with respect to the information within the packet that can be processed by the packet processing circuitry 106 for classification and forwarding purposes. As such, the routing control information 107 from the packet processing controller 105 is limited to classification and forwarding control information related to recognized data ($D_R$) within the packets. As indicated above, this recognized data ($D_R$) depends upon the protocol headers and fields that can be used by the packet routing circuitry 106 for processing, classification and forwarding of the incoming packets. Thus, due to the capabilities and limitations of the packet routing circuitry 106, the output packets 120 can be processed, classified and forwarded to the destination devices 122 based only upon the recognized data ($D_R$) within portions of the packet protocols that are recognized for packet processing purposes by the packet routing circuitry 106.

NTO device 102, therefore, is not able to process, classify, and forward packets based upon the unrecognized data ($D_X$) within the input packets 110. As indicated above, the unrecognized data ($D_X$) represents data in headers or fields within the packets that are not supported by the processing capabilities of the packet routing circuitry 106 for packet classification and forwarding purposes. Because the packet routing circuitry 106 is configured to process only the recognized data ($D_R$) within certain protocol headers/fields supported by the packet routing circuitry 106 for packet processing, the unrecognized data ($D_X$) in other portions of the packets cannot be processed by the packet routing circuitry 106 for packet classification and forwarding purposes. Instead, the packet routing circuitry 106 must ignore the unrecognized data ($D_X$) as indicated by arrow 118 for purposes of classifying and forwarding packets. As such, the packet routing circuitry 106 cannot use the unrecognized data ($D_X$) to process, classify, and forward the input packets 110 to one or more of the destination devices 122.

Destination devices 122, therefore, can receive output packets 120 depending upon the packet classification and forwarding control information provided by the packet processing controller 104 only with respect to the recognized data ($D_R$). The destination devices 122 will not receive output packets based upon classification and forwarding control information that is based upon the unrecognized data ($D_X$), as the packet routing circuitry 106 is not capable of using this unrecognized data ($D_X$) for purposes of packet classification and forwarding due to their internal processing limitations. Examples of packets having data that is recognized and unrecognized for packet processing purposes by standard packet routing circuitry is now discussed with respect to FIGS. 1B and 1C.

FIG. 1B (Prior Art) provides a diagram for an example TCP/IP formatted packet 150 having headers that are typically recognized by standard packet switch ICs. In particular, as shown in FIG. 1B (Prior Art), example packet 150 includes a MAC header 152 (e.g., that may be included as part of an Ethernet frame header), an IP header 154 (e.g., IPv4 or IPv6 header), a TCP/UDP header 156 and a payload field 160 along with other possible fields 158. Typically, packet routing circuitry 106 will be configured to process and route packets based upon information in the MAC header 152, the IP header 154 and the UDP/TCP header 156. These three headers are recognized by the packet routing circuitry 106 for purposes of packet classification and forwarding, while the payload field 160 and the other fields 158 are typically not recognized for purposes of packet classification and forwarding. Thus, only data ($D_R$) in the recognized portion 162 of the packet 150 can be used for packet routing, while data ($D_X$) in the unrecognized portion 164 of the packet 150 is ignored by the packet routing circuitry 106.

FIG. 1C (Prior Art) provides a diagram for an MPLS tagged TCP/IP formatted packet 170 that includes an MPLS header that is typically not recognized by standard packet switch ICs for packet processing and forwarding. In particular, as shown in FIG. 1C (Prior Art), example packet 170 includes a MAC header 172, an MPLS header 174, an IP header 176, a TCP/UDP header 178 and a payload field 180. It is noted that other fields could also be included if desired. MPLS tagged packets typically represent an unrecognized protocol for standard network routing ICs. As such, due to the MPLS header 174 being inserted into the packet 170, the remaining portion 184 of the packet 170 will be unrecognized by the standard packet routing circuitry 106 for packet processing and forwarding purposes. Thus, only the recognized outer portion 182 (e.g., MAC header 172 in this example) can be used for packet classification and routing by the packet routing circuitry 106, while the unrecognized portion 184 is ignored by the packet routing circuitry 106. Thus, if MPLS enabled packets are forwarded to the packet routing circuitry 106, as the packet routing circuitry 106 is not MPLS capable (e.g., does not have the ability to parse MPLS tagged packets to locate the TCP/IP header information), the packet routing circuitry 106 will not be able to classify and forward packets based upon information in the IP header 176 or the TCP/UDP header 178.

To address the need to process unrecognized portions of packets for packet classification and forwarding purposes, some systems support classification of packets based on custom offsets. A custom offset is used to select a field in the packet based upon a fixed index value from the beginning of the packet. This solution, however, is extremely limited for a number of reasons. One reason is that the availability of these custom offset capabilities is restricted to a small number of pattern definitions. Another reason is that the exact position of the desired field must be known and must remain fixed for this method to work properly. However, for many protocols, the packet formats are variable in length and the exact location of a particular field is not in a fixed position in every packet.

While more sophisticated packet processing ICs could potentially be designed that add processing recognition for currently unrecognized portions of packet protocols, supporting every available protocol or protocol variation would be extremely complex. In addition, data within new protocols would still be unavailable until an IC manufacturer chose to add these new protocols to the processing capability for their packet processing network IC devices.

SUMMARY OF THE INVENTION

Systems and methods are disclosed for modifying network packets to use unrecognized headers/fields for packet classification and forwarding in packet processing systems, such as, for example, network tool optimizer (NTO) devices. The methods and systems described herein allow standard switch or routing integrated circuits (ICs) to be used to process, classify, and forward packets based upon data that is not recognized by the hardware capabilities of the standard packet routing circuitry for packet processing. Input packets are modified so that unrecognized data becomes recognized data for purposes of packet processing, classification, and forwarding by the packet routing circuitry. These modifications are then removed after packets are processed to reform the original packets. The original packets are then provided to destination devices based upon packet classification and forwarding control information. As such, packet processing is thereby provided using headers/fields that are not supported for processing by standard switch or routing integrated circuits (ICs). Various features and variations can be implemented, if desired, and related systems and methods can be utilized, as well.

In one example implementation, input packets are modified by adding encapsulation headers that are recognized and processed by the standard packet routing circuitry. The encapsulation headers are formed by copying data from inner portions of the input packets or from outside the input packets, where it cannot be recognized by the packet routing circuitry, to the encapsulation headers in outer portions of the input packets, where this data can be recognized by the packet routing circuitry. The outer portions, including the encapsulation headers, are then processed by the packet routing circuitry to classify and forward the input packets according to control information provided to the packet routing circuitry. Once the encapsulated packets are processed, the encapsulation headers are removed to reform the original packets. These original packets are then forwarded to the appropriate destination devices.

In another example implementation, input packets are modified by swapping data into headers/fields that are already recognized and processed by the standard packet routing circuitry. Data is swapped from inner portions of input packets or from outside the input packets, where it cannot be recognized by the packet routing circuitry, into outer portions of input packets, where this data can be recognized by the packet routing circuitry. The outer portions of the input packets are then processed by the packet routing circuitry to classify and forward the input packets according to control information provided to the packet routing circuitry. Once the swapped packets are processed, the original packets are reformed by de-swapping the information. The original packets are then forwarded to the appropriate destination devices.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 1B (Prior Art) is a diagram for a standard TCP/IP packet.

FIG. 1C (Prior Art) is a diagram for a standard MPLS tagged TCP/IP packet.

FIG. 3A is a block diagram for an embodiment of a system for processing packets that adds encapsulation headers as packet modifications.

FIG. 3B is a diagram for an encapsulated MPLS tagged TCP/IP packet.

DETAILED DESCRIPTION OF THE INVENTION

Systems and methods are disclosed for modifying network packets to use unrecognized headers/fields for packet classification and forwarding in packet processing systems, such as, for example, network tool optimizer (NTO) devices. The methods and systems described herein allow standard switch or routing integrated circuits (ICs) to be used to process, classify, and forward packets based upon data that is not recognized by the hardware capabilities of the standard packet routing circuitry for packet processing. Input packets are modified so that unrecognized data becomes recognized data for purposes of packet processing, classification, and forwarding by the packet routing circuitry. These modifications are then removed after packets are processed to reform the original packets. The original packets are then provided to destination devices based upon packet classification and forwarding control information. As such, packet processing, classification, and forwarding is thereby provided in packet processing systems using headers/fields that are not supported for processing by standard switch or routing integrated circuits (ICs). As described herein, various features and variations can be implemented, if desired, and related systems and methods can be utilized, as well.

Figure 1A:
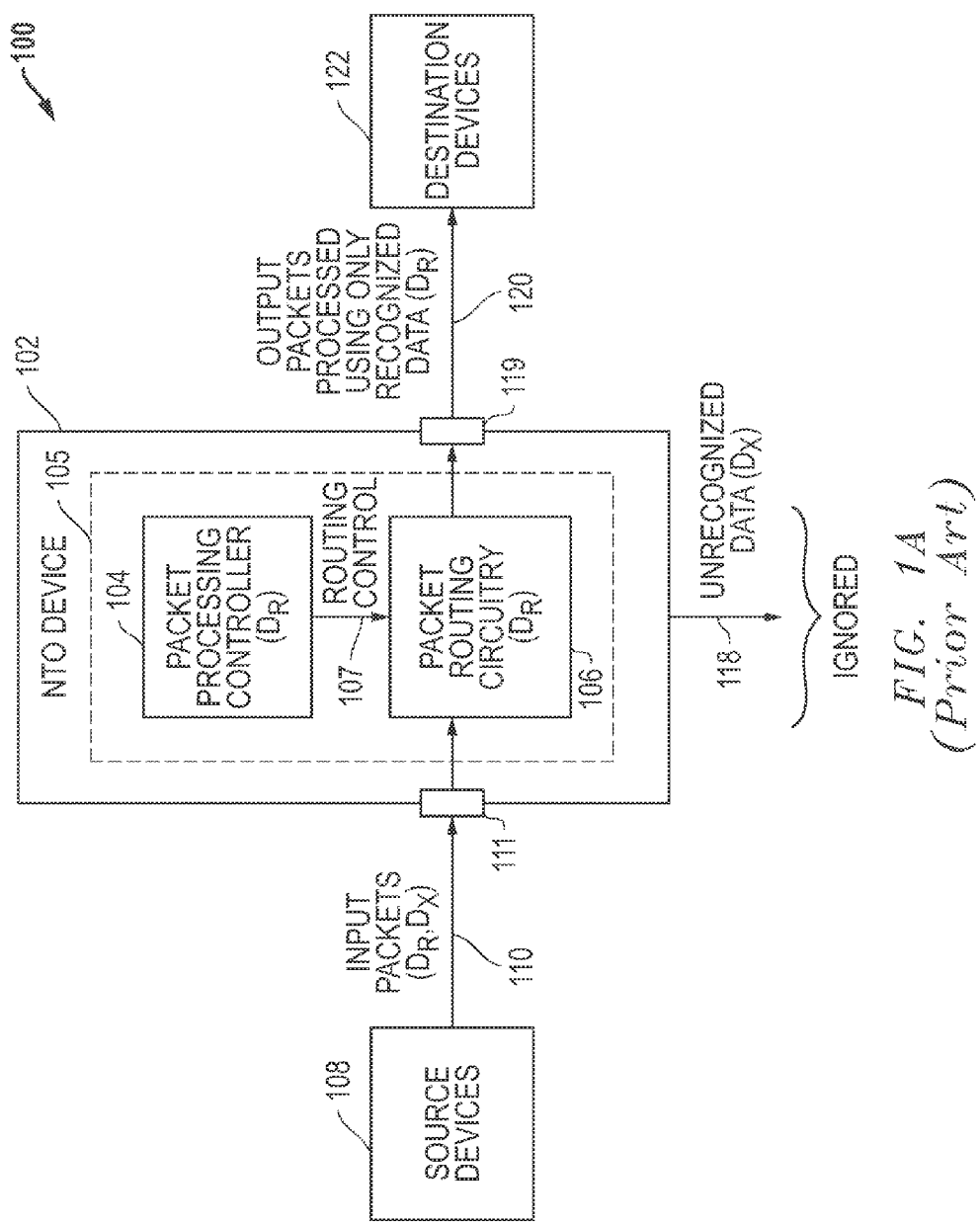
FIG. 1A (Prior Art) is a block diagram for an embodiment of a prior system that utilizes standard packet routing circuitry.
Figure 2:
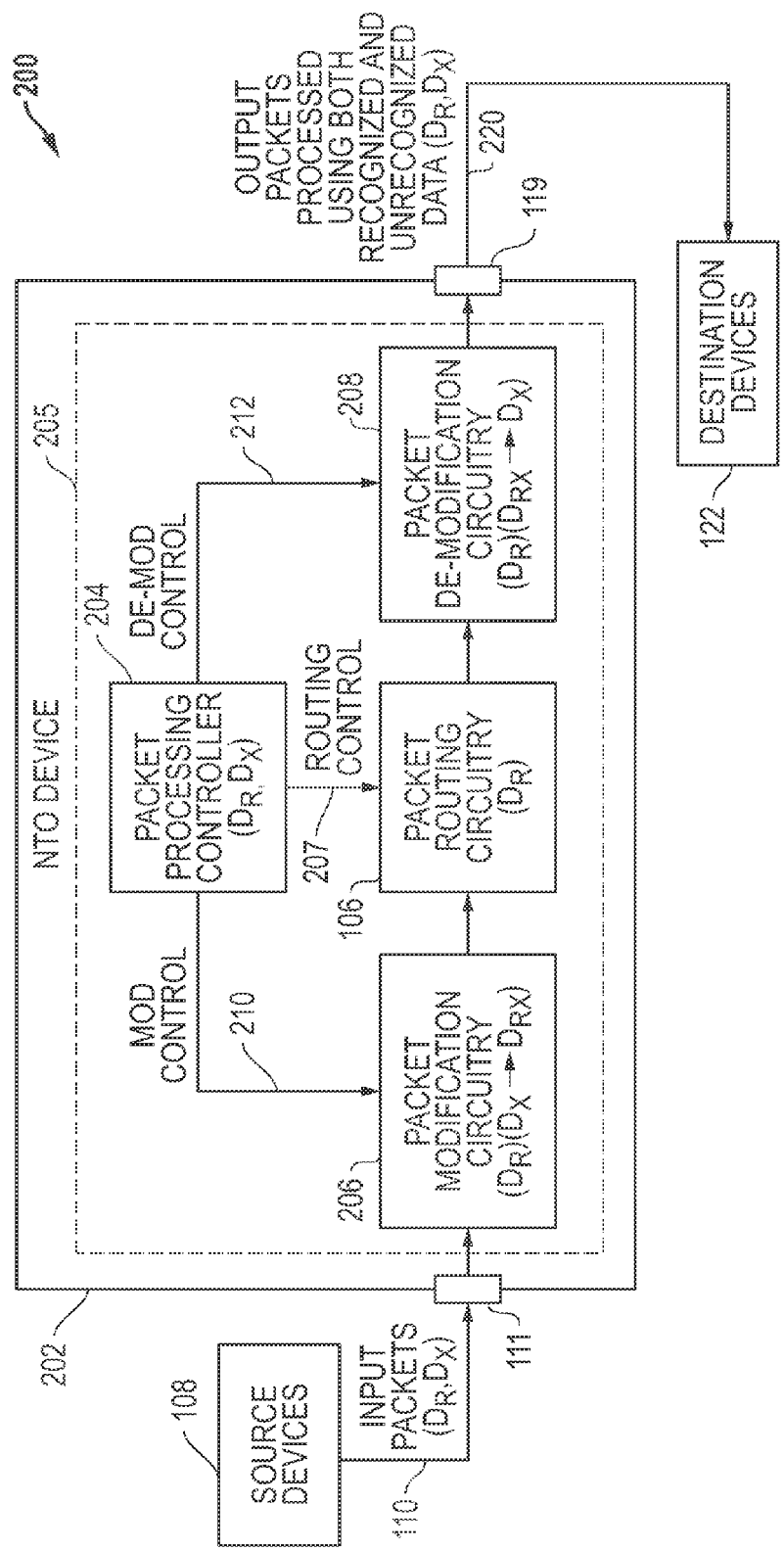
FIG. 2 is a block diagram for an embodiment of a system for processing packets that modifies packets to allow packet routing circuitry to process packets using unrecognized data.

FIG. 2 is a block diagram for an embodiment 200 that allows packet routing circuitry 106, implemented using standard network switch or routing ICs, to be used to process packets based on data within portions of packets that are not recognized by the hardware processing capabilities of the packet routing circuitry 106. As with the embodiment 100 in FIG. 1A (Prior Art), the NTO device 202 includes packet routing circuitry 106 that is configured to recognize and process data within certain portions of packets formatted using a set of standard or custom protocols recognized by the packet routing circuitry 106, and NTO device 202 is configured to provide output packets to the one or more destination devices 122 through one or more output ports 119. As also with the embodiment 100 of FIG. 1A (Prior Art), the NTO device 202 receives input packets 110 from sources devices 108 through one or more input ports 111. As described above, these input packets 110 will be formatted according to one of various packet protocols and will have both data ($D_R$) in portions of packets that can be recognized and processed by the packet routing circuitry 106 and data ($D_X$) in portions of packets that cannot be recognized and processed by the packet routing circuitry 106.

However, unlike FIG. 1A (Prior Art), the packet processing circuitry 205 for the NTO device 202 includes packet modification circuitry 206 and packet de-modification circuitry 208. The NTO device 202 also utilizes a packet processing controller 204 that can apply control information, including classification and forwarding rules, based upon both recognized data ($D_R$) and unrecognized data ($D_X$) to control how packets are classified and forwarded by the packet processing circuitry 205. The packet processing controller 204 communicates with the packet modification circuitry 206, the packet de-modulation circuitry 208, and the packet routing circuitry 106 to provide this control information, including modification control information 210, de-modification control information 212, and routing control information 207 that provides classification and forwarding control information for the input packets processed by the packet routing circuitry 106.

In operation, depending upon modification control information 210 provided by packet processing controller 204, input packets 110 are modified by packet modification circuitry 206 and then passed along to the packet routing circuitry 106. The packet routing circuitry 106 then processes, classifies and forwards the input packets according to routing control information 207 from the packet processing controller 204 that includes classification and forwarding control information. The processed packets are then provided to packet de-modification circuitry 208 where modifications made to the packets are removed based upon the de-modification control information 212. Output packets 220 are then provided to the appropriate destination devices 122. Thus, unrecognized data ($D_X$) within input packets 110 can be modified by packet modification circuitry 206 so that this unrecognized data ($D_X$) becomes recognized data ($D_{RX}$) that can be used by the packet routing circuitry 106 for packet classification and forwarding purposes. Once processed, these modified packets can then be provided to the packet de-modification circuitry 208. This packet protocol de-modification circuitry 208 removes the modifications provided by the packet protocol modification circuitry 206 to reform the original input packets so that they have the original unrecognized data (i.e., $D_{RX}$ becomes original $D_X$). These reformed packets are then provided as output packets to the appropriate destination devices 220. Further, if packets already include recognized data ($D_R$) that is desired to be used for packet classification and forwarding purposes, these packets can be left unmodified when they are provided to the packet routing circuitry 106. These unmodified packets are then passed by packet de-modification circuitry 208 along to the appropriate destination devices 220 without requiring de-modification of the already recognized data ($D_R$). Advantageously, therefore, through the packet modification and de-modification process, the output packets 220 have been processed, classified, and forwarded using recognized data ($D_R$) and/or unrecognized data ($D_X$) from within the input packets 110. Further, the input packets can also be modified to include unrecognized data not within the original input packet so that this additional data can be recognized and used by the packet routing circuitry 106 in classifying and forwarding the input packets, if desired.

FIGS. 3A-B, 4A-B, 5A-C and 6A-B are now discussed. These drawings provide two example embodiments for the modification/processing/de-modification techniques of FIG. 2. In particular, FIGS. 3A-B and 4A-B provide example embodiments where additional encapsulation headers are inserted into packets so that the data inserted into the new encapsulation headers will be recognized and processed by the packet routing circuitry 106. FIGS. 5A-C and 6A-B provide example embodiments where data within unrecognized portions of packets are swapped with data in recognized portions of packets so that this swapped data will be recognized and processed by the packet routing circuitry 106. Thus, the first example embodiments increase the size of the original packets using additional encapsulation headers. And the second example embodiments re-arrange the original packets, thereby adjusting the location of information within the packets without increasing their size. Both example embodiments advantageously allow data in traditionally unrecognized portions of packets to be processed and used by the packet routing device to classify and forward packets. Various features and variations can be implemented, if desired, and related systems and methods can be utilized, as well.

It is also noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits), and/or other programmable integrated circuitry. In addition, one or more processors running software or firmware could also be used, if desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs), and/or processors to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

Looking now to FIGS. 3A-B and 4A-B, example embodiments are described where additional encapsulation headers are inserted into packets so that data included within the resulting encapsulation headers can be recognized and processed by the packet routing circuitry 106 for packet classification and forwarding purposes.

FIG. 3A is a block diagram for an embodiment 300 that utilizes encapsulation headers to allow traditionally unrecognized data ($D_X$) in packets to be processed by the packet routing circuitry 106 and used for classification and forwarding of packets. As depicted, packets 301 from one or more ingress ports 111 on the NTO device 202, which include both recognized data ($D_R$) and unrecognized data ($D_X$) with respect to packet routing circuitry 106, are received by encapsulation blocks 304A, 304B and 304C. In particular, the packet streams 302A, 302B, and 302C from respective ingress ports are received by encapsulation blocks 304A, 304B, and 304C before being provided to packet routing circuitry 106. As described above, packet routing circuitry 106 is configured to use only data ($D_R$) within certain recognized portions of packets for classification and forwarding of packets. For packets where data ($D_X$) in unrecognized portions of packets is to be used for classification and forwarding, the encapsulation blocks 304A, 304B, and 304C add outer encapsulation headers that are configured to include this unrecognized data ($D_X$). The encapsulation headers can then be successfully processed by the packet routing circuitry 106 and used to classify and forward packets to the appropriate egress port for the NTO device 202. As depicted, the de-encapsulation blocks 306A, 306B, and 306C receive packets from the packet routing circuitry 106 and de-encapsulate these packets to reform the original packets and to provide packet streams 308A, 308B, and 308C to respective egress ports 119. Advantageously, these reformed packets 310 that are provided to one or more egress ports 119 include the recognized data ($D_R$) and unrecognized data ($D_X$) in there original locations within the packets.

Thus, in operation, outer encapsulation headers are added to packets at the ingress ports by the encapsulation blocks 304A-C so that data ($D_X$) in unrecognized portions of packets can be used by the packet processing system to classify and forward packets. For example, information can be copied from an inner location within the original packet, which would not be recognized and used for processing by the packet routing circuitry 106, to the encapsulation header in an outer location, where the packet routing circuitry 106 can use this copied information to make classification and forwarding decisions. The encapsulated packet is then processed by the packet routing circuitry 106 and is classified and forwarded based upon the data in the encapsulation header and control information from the packet processing controller 204. At the egress port, the encapsulation header is stripped from the encapsulated packet by the de-encapsulation blocks 308A-C, thereby restoring or reforming the original packet. Advantageously, the encapsulation technique provided in the embodiment 300 is contained within the NTO device 202 without requiring processing outside the NTO device 202.

It is noted that the additional information added to the encapsulation header for the existing packet is preferably designed to appear to be a standard or custom packet header that would be recognized and processed by the packet routing circuitry 106. It is further noted that a variety of encapsulation headers may be used depending upon the packet header desired to be emulated. For example, the encapsulation header could be made to appear as an internet protocol (IP) header, such as an IPv4 protocol header or an IPv6 protocol header.

It is further noted that information from headers and/or fields in various locations within the original packet can be placed into the encapsulation header, as desired. Further, the fields to be used can be configured to be specified through external user interactions with the NTO device 202 and the packet processing controller 204. For example, the external user can be allowed to make an explicit selection of the headers and/or fields to be used for the encapsulation header. The user could also be allowed to make a more abstract specification of desired operational results, and the packet processing controller 204 can be configured to automatically select specific headers/fields to satisfy the requested operation. Once the headers/fields are selected for use, these selected headers/fields are then located within the original packet by the packet processing circuitry, for example, through a parsing operation. Once located, an encapsulation header is added to the packet, and the information within the located headers/fields is copied into the encapsulation header. The packet routing circuitry 106 then processes the packets and makes classification and/or forwarding decisions based upon the encapsulation header, rather than the original packet header information. It is further noted that a portion of the encapsulation header information preferably includes one or more bits that allow encapsulated packets to be identified and de-encapsulated at the egress ports. In addition, unrecognized data not within the original input packet can also be inserted into the encapsulation header so that it can be recognized and used by the packet routing circuitry 106 in classifying and forwarding the input packets, if desired.

It is noted that the embodiments described herein can utilize TCAM (ternary content addressable memories) mechanisms that exist within many current network switch or routing ICs to classify packets and forward them based upon those classifications. Where TCAM mechanisms are used by the packet routing circuitry 106, TCAM filter/mask pairs can be created by the packet processing controller 204 and provided to the packet routing circuitry 106 so that fields used for the encapsulation header can be matched by the packet routing circuitry 106. The embodiments described herein can also be used in conjunction with other mechanisms in network switch ICs to cause other actions to be taken with respect to the processed packets in addition to forwarding actions. Further, the embodiments described herein can also utilize processing mechanisms other than TCAM mechanisms, if desired.

Once the forwarding operation has been performed by the packet routing circuitry 106, the processed packets will be received at the appropriate egress port based upon the forwarding actions applied. The de-encapsulate blocks 308A-C can be associated with respective egress ports and can operate to identify and process packets having additional encapsulation headers. The encapsulation headers can then be discarded from these packets, returning them to their original form. The de-encapsulated packets are then queued for transmission from the egress port. Packets that have not had encapsulation headers added may also be queued for transmission without modification. It is noted that many standard packet routing or switch ICs will have packet buffers and filter engines associated with the input/ingress ports 111 and the output/egress ports 119. In operation, the packet buffers store the incoming or outgoing packets, respectively, and the filter engines process the stored packets according to classification and forwarding control information and/or additional control information, depending upon the capabilities of the particular network routing or switch ICs.

FIG. 3B provides a diagram for an example embodiment 350 for an encapsulated packet. In particular, embodiment 350 represents an MPLS tagged TCP/IP packet that has been encapsulated by the addition of IP header 352 and TCP/UDP header 354 as an encapsulation header 364. Without the encapsulation header 364, the packet routing circuitry 106 would not be able to process the packet based upon information in the TCP/UDP header 178 and the IP header 176 as the MPLS header 174 interferes with processing by standard network routing and switch ICs. As shown in FIG. 3B, data such as source/destination IP addresses from the IP header 176 can be copied into the new IP header 352 as shown by arrow 360. Similarly, data such as port numbers from the TCP/UDP header 176 can be copied into a new TCP/UDP header 354 as shown by arrow 362. By adding an encapsulation header 364 and copying data from the original IP header 176 and original TCP/UDP header 178 into these new headers 352/354 in the encapsulation header 364, the packet routing circuitry 106 will now recognize the new headers 352/354 and the data inserted into these new headers, allowing for packet classification and forwarding based upon the respective values within fields within these new headers 352/354. As such, data (e.g., source/destination IP addresses and TCP/UDP port numbers) that was originally in portions of the packet 350 that would not be recognized for packet classification and forwarding by the packet routing circuitry 106 can now be recognized and used by the packet routing circuitry 106 for classification and forwarding of the input packets.

It is noted that FIG. 3B provides an example where IP source and destination addresses in the IP header 176 and TCP/UDP port numbers in the TCP/UDP header 178 are copied from the original packet into the encapsulation header 364. Other headers or fields can also be mapped from the original packet into the encapsulation header, as desired, depending on what is required to make the desired classification and forwarding decisions. For example, MPLS labels in the MPLS header 174 could be mapped into the TCP/UDP port number within the TCP/UDP header 354 if desired. Other variations could also be implemented, as desired. For example, unrecognized data that was not within the original input packet could nevertheless be inserted into the encapsulation header so that it can be recognized and used by the packet routing circuitry for packet classification and forwarding purposes.

As indicated above, one or more bits within the encapsulation header 364 are used to indicate whether a packet has been encapsulated. For example, where an IP header within an IPv4 formatted packet has been copied to the encapsulation header, the protocol field in the IP header could be used to allow the packet processing system to differentiate between an un-modified packet and an encapsulated packet. The protocol field in an IPv4 packet header is an 8-bit value that normally indicates what type of L4 (network layer four) protocol is being used. In IPv4 headers, this field is called the "Protocol" field, and includes bits 72-79 of the IPv4 header. In IPv6 headers, this field is called the "Next Header" field, and includes bits 48-55 of the IPv6 header. Currently, these fields in IPv4 headers and IPv6 headers only have values up to 0x8C assigned to existing protocols. As an example, a TCP protocol is indicated by 0x06 existing in these fields, and a UDP protocol is indicated by 0x11 existing in these fields. Values above 0x8C have not been specified by the protocol standard for these IP headers.

Because there are values for certain fields within packet protocol headers that have not been assigned, these unassigned values can be used to identify packets that have been encapsulated and to identify what particular encapsulation has been made. For example, for the purpose of detecting encapsulated packets at the egress port, unassigned values for the protocol fields in packet headers for IPv4 and IPv6 formatted packets could be used to identify packets that have had encapsulation headers added to them. In particular, values larger than 0xC0 could be used, as such values are currently not assigned by standards organizations. Further, where multiple unassigned values are available, these unassigned values can be used not only to indicate the presence of an encapsulation header, but also to indicate how the fields in the encapsulation header are mapped. Still further, it is noted that a single field or multiple fields could be used, as desired, to provide an indication of whether a packet has been modified and what modification has been done.

TABLE 1 below provides an example for encapsulation headers added by the packet processing system for packets that have been formatted with GTP or MPLS headers. The encapsulation header for this example is assumed to have an IP header 352 and a TCP/UDP header 354 to emulate an TCP/IP formatted packet, as shown for encapsulation header 364 in FIG. 3B. For reference, in TABLE 1 below, the IP addresses inside the GTP and MPLS headers will be referred to as the inner IP addresses. The IP addresses in the encapsulation header will be referred to as outer IP addresses. For these examples, the outer IP addresses in the encapsulation headers are created from the inner IP addresses. Further to the IPv4 and IPv6 examples above, the protocol field of the encapsulation IP header is used to signal which mapping is valid for the current packet. The TCP/UDP port numbers in the encapsulation headers can also be programmed to be several different fields, as further shown in TABLE 1 below. Further, as indicated above, unassigned values (UVs) larger than 0xC0 could be used for the protocol values to indicate what type of packet is being modified and what modification has been made. Other combinations could also be implemented, as desired.

TABLE 1

EXAMPLE ENCAPSULATION INDICATORS

| Protocol value | Outer Encapsulation IP address | Outer Encapsulation TCP/UDP port number |
|---|---|---|
| UV-1 (GTP packet) | Inner IP address | Inner TCP/UDP port number |
| UV-2 (GTP packet) | Inner IP address | GTP TEID |
| UV-3 (MPLS packet) | Inner IP address | Inner TCP/UDP port number |
| UV-4 (MPLS packet) | Inner IP address | MPLS label 1 |
| UV-5 (MPLS packet) | Inner IP address | MPLS label 2 |
| UV-6 (MPLS packet) | Inner IP address | MPLS label 3 |
| UV-7 (MPLS packet) | Inner IP address | MPLS label 4 |
| UV-8 (MPLS packet) | Inner IP address | MPLS label 5 |
| UV-9 (MPLS packet) | Inner IP address | MPLS label 6 |
| UV-10 (MPLS packet) | Inner IP address | MPLS label 7 |
| UV-11 (MPLS packet) | Inner IP address | MPLS label 8 |

Figure 4A:
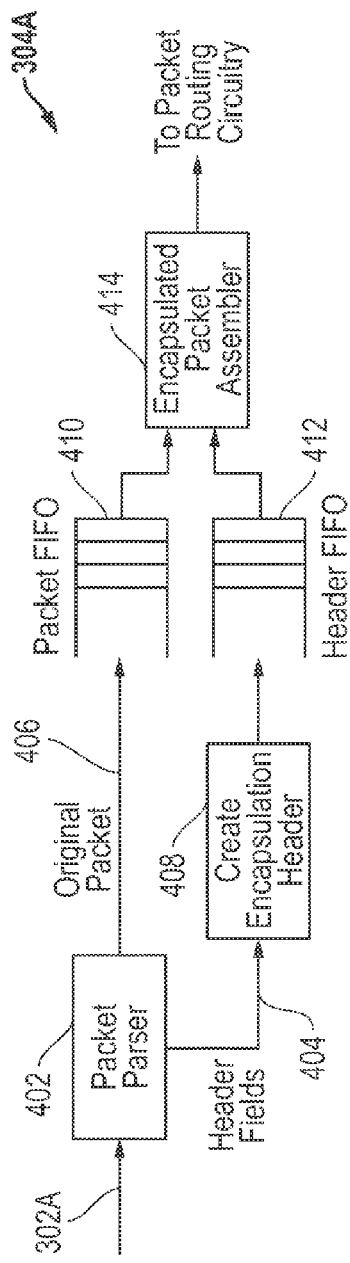
FIG. 4A is an example embodiment of encapsulation circuitry that adds encapsulation headers to packets using unrecognized data within the packets.

FIG. 4A provides an example embodiment for an encapsulation block 304A that can be utilized to add an encapsulation header. The incoming packets 302A are first sent to a packet parser 402 that can process and parse the packets based upon the protocols used for formatting the packets. For packets to be processed using unrecognized data ($D_X$), the packet parser 402 extracts the fields that are required for the encapsulation header and provides these header fields 404 to processing block 408. Processing block 408 then creates the encapsulation header and sends it to the header FIFO (first in first out) buffer 412, where it is stored. The packet parser 402 also sends the original incoming packets 406 to the packet FIFO buffer 410, where they are stored. The encapsulated packet assembler 414 then receives original packets from the packet FIFO 410 and receives the encapsulation headers from the header FIFO 412. The encapsulated packet assembler 414 then assembles the encapsulated packet and outputs the encapsulated packet to the packet routing circuitry. For packets that are to be processed using only recognized data ($D_R$), the packet assembler 414 receives the original packets from the packet FIFO 410 and outputs the original packets to the packet routing circuitry without modification.

Figure 4B:
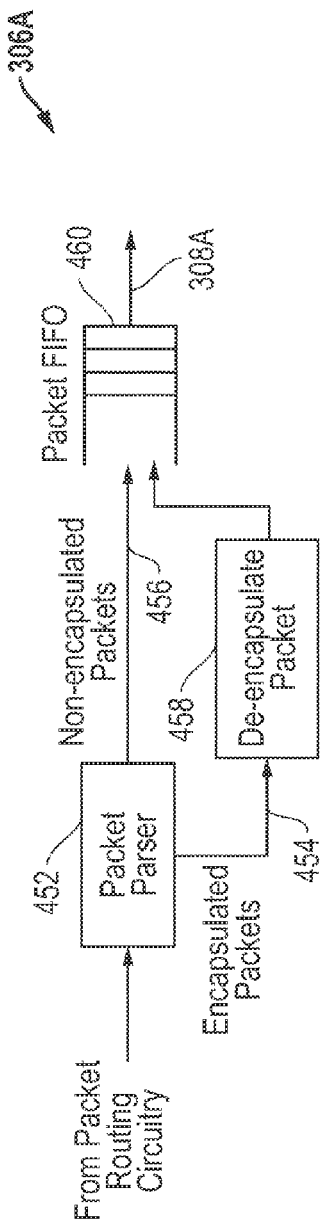
FIG. 4B is an example embodiment of de-encapsulation circuitry that removes encapsulation headers to reform original packets.

FIG. 4B provides an example embodiment for a de-encapsulation block 306A that can be used to remove the encapsulation headers. Packets from the packet routing circuitry are received by the packet parser 452. The packet parser 452 then determines if and how each packet has been encapsulated. Encapsulated packets 454 are provided to the processing block 458 where the packet is de-encapsulated to remove the additional encapsulation header and to reform the original packet. The de-encapsulated and reformed packets are then provided to the packet FIFO 460 where they are stored. Non-encapsulated packets 456 are provided directly to the packet FIFO 460 where they are stored. The packet FIFO 460 then outputs the original packets 308A.

It is noted that the encapsulation header can include information from any desired header or field in the original packet, as long as the field being selected and used for the encapsulation header can be recognized and processed by the packet routing circuitry 106. For example, an additional layer two (L2) Ethernet frame header could be used as the encapsulation header, and data inserted into a MAC header within this new L2 header could be used for classification and forwarding of input packets. Using such a MAC header as the additional data within an encapsulation header for packet processing, for example, would allow the NTO device 202 to use very simple, low cost L2-only packet processors for the packet routing circuitry 106.

As another example, a MAC header, an IP header, and a TCP/UDP header could be used as the encapsulation header. Using these three headers as the encapsulation header, for example, will allow the packet processing controller 204 and the packet routing circuitry 106 to use more fields (e.g., MAC addresses, IP addresses, TCP/UDP port numbers) within these headers for classification and forwarding of input packets.

It is further noted that other information from packets could also be mapped into the encapsulation header, if desired. For example, information could be extracted from the packet payload 180 and inserted into the encapsulation header. This information could be identified within the packet payload 180, for example, through an analysis and inspection of the contents of the packet payload 180 by the packet processing system. One example use of using information from packet payloads could be searching the packet payload for results that match a regular expression and then using matched results as part of the encapsulation packet. For example, these match results could be copied into the IP address fields within the encapsulation header and used for packet classification and forwarding decisions by the packet routing circuitry 106. Variations could also be implemented, as desired.

It is noted that the packet modification techniques described herein are also useful when new protocols become available that are not recognized or supported by the packet routing circuitry 106. Packet processing control information for such a new protocol could be generated by the packet processing controller 204 and provided to the packet modification circuitry 206, the packet protocol de-modification circuitry 208, and the packet routing circuitry 106. For example, where an encapsulation header is used as the modification, a new encapsulation header can be implemented in the encapsulation blocks 304A-C and the required fields can be mapped into the encapsulation header to allow the packet routing circuitry 106 to process, classify, and forward packets formatted using this new unsupported protocol. It is further noted that the packet processing controller 204 is preferably implemented as programmable circuitry to allow for additional or updated programming to account for additional modifications desired in the packet processing control information.

As noted above, unrecognized data that was not within the original input packet can also be inserted into the encapsulation header so that it can be recognized and used by the packet routing circuitry for packet classification and forwarding purposes. For example, data not contained in the original packet, which would have been unrecognized by the packet routing circuitry for packet classification and forwarding purposes, could be inserted into the packet so that it can be recognized and used by the packet routing circuitry. One example for insertion of such data is insertion of the ingress port number for a packet to allow the packet routing circuitry to process, classify and forward packets based upon the ingress port number. Other or different data that was not within the original input packet could also be inserted so that this unrecognized data becomes recognized data within the input packet, depending upon the capabilities of the packet routing circuitry utilized. Variations could also be implemented, as desired.

Looking now to FIGS. 5A-C and 6A-B, example embodiments are described where data ($D_X$) from portions of packets that are not recognized by the packet routing circuitry 106 for packet processing, classification, and forwarding purposes is swapped with data ($D_R$) in other portions of the packets that are recognized by the packet routing circuitry 106 for processing, classification, and forwarding of packets.

It is first noted that one potential drawback to adding an encapsulation header, as described above, is that the addition of the encapsulation header will increase the packet size. This increased packet size potentially reduces available bandwidth, and this reduction in available bandwidth can lead to problems such as packet delays and dropped packets. One alternative solution to using an encapsulation header is to swap headers or fields from an inner portion of the original packet, which is not used by the packet routing circuitry 106 for processing packets, with headers or fields within an outer portion of the packet, which is used by the packet routing circuitry 106 for processing packets. Advantageously, this swapping technique places unrecognized data ($D_X$) into headers and/or fields that can be used by the packet processing system 106 for its processing, classification, and forwarding of packets.

Figure 5A:
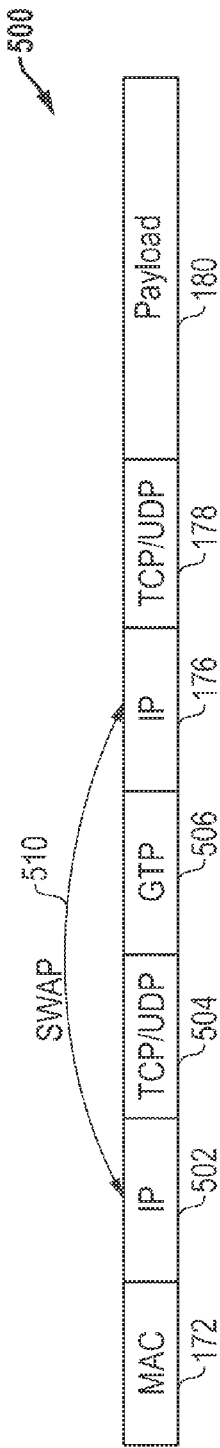
FIG. 5A is a diagram for a GTP tagged packet having swapped information.

FIG. 5A is a diagram for an embodiment of a GTP tagged TCP/IP packet 500 where information from an inner IP header 176 is swapped with information from an outer IP header 502, as shown by double arrow 510. The inner IP header 176 is located in a position within the packet 500 that is not recognized by the packet routing circuitry 106 for purposes of classifying and forwarding the packet 500, while the outer IP header field 502 is located in a position within the packet 500 that is recognized by the packet routing circuitry 106 for purposes of classifying and forwarding the packet 500. By swapping information from the inner and outer IP headers, the packet can now be processed, classified, and forwarded by the packet processing circuitry 205 based on the new IP header information swapped into the outer IP header 502 from the inner IP header 176.

It is noted that this field swapping can be implemented by using L3 (network layer three) headers, by using L4 (network layer four) headers or by using both L3 and L4 headers, if desired. Further, other combinations of field swapping and network layers could also be used, if desired. For example, swapping inner and outer MAC headers within an MPLS tagged, network layer two (L2), VPN (virtual private network) packets could be used.

Where a packet does not have both inner and outer headers of the same type, certain internal fields within the different header types can be swapped instead. For example, IP addresses within different header types can be swapped. One example of this swapping of internal fields within different header types is described with respect to FIG. 5B below.

Figure 5B:
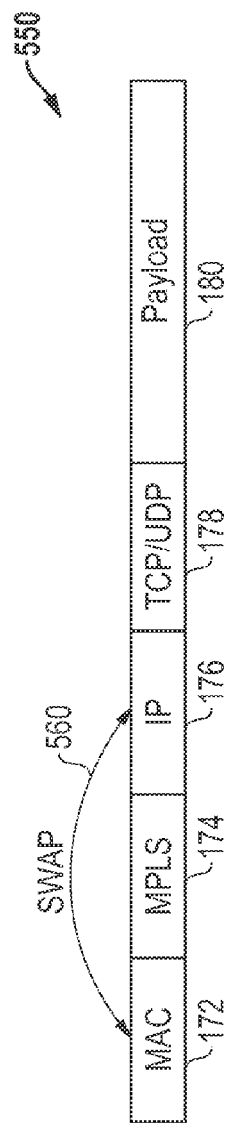
FIG. 5B is a diagram for an MPLS tagged TCP/IP packet having swapped information.

FIG. 5B is a diagram for an embodiment of a packet 550 that is formatted as an MPLS tagged, network layer three (L3), VPN packet. The packet 550 does not have an outer IP header. However, the packet 550 does have a MAC header 172. As such, the IP address fields within the inner IP header 176 can be swapped with the MAC address fields within the MAC header 172 as shown by double arrow 560. By swapping the IP address and MAC address fields, the packet processing circuitry 205 can now use the swapped IP address information within the MAC address fields 172 for processing, classification, and forwarding of the packet.

It is noted that headers or fields of different sizes can also be swapped, if desired. If the inner header/field being swapped is smaller than the outer header/field being swapped, some bits within the outer header/field can be ignored during processing and classification of the packet. If the inner header/field information being swapped is larger than the outer header/field information being swapped, some bits within the inner header/field can be excluded during swapping of the fields. Other variations could also be implemented as desired.

One example of fields within an inner header that can be swapped with fields within an outer header of a different type and size is the swapping of MPLS labels in MPLS tagged packets with MAC addresses within outer MAC headers. For example, an MPLS label within an inner MPLS header is 20 bits in length. This 20-bit MPLS label could be swapped with 20 bits of a MAC address field within an outer MAC header, which is usually 48 bits in length.

As with the encapsulation header described above, to swap the header/fields back after processing the packets, the packets are marked with information indicating that a swap has been done. It is again noted that unassigned values for fields within the protocols utilized to format the packets can be used to identify packets that have had swapped data and to indicate what particular data swapping has been done. For example, one technique for providing the swap information is to use the protocol field in IP headers or the Ethertype field in Ethernet frame headers. The value inserted into these fields can be configured to identify how the headers/fields have been swapped and also to identify the previous value of these fields. As such, the previous value can be restored when the headers/fields are swapped back to reform the original packet. As also described above with respect to the encapsulation header, external users can be allowed to configure the headers/fields that are used in the information swap, if desired.

TABLE 2 below provides an example for using the protocol fields within IPv4 or IPv6 headers to identify swapped information. For this example, GTP tagged packets are used such as GTP tagged packet 500 as shown in FIG. 5A, and the inner IP header 176 and outer IP header 502 are swapped. The protocol field within the swapped inner IP header 176 is then encoded with an unassigned value (UV) to identify the swap information so that the egress processing circuitry can swap back the values to the original state.

TABLE 2

EXAMPLE HEADER SWAP INDICATORS

| Protocol value | Swap | Prior Value |
|---|---|---|
| UV-1 | IP headers were swapped | Protocol value was 0x06 |
| UV-2 | IP headers were swapped | Protocol value was 0x11 |

TABLE 3 below provides an example for using the Ethertype fields within Ethernet frame headers to identify the swap information. For this example, MPLS tagged packets such as MPLS tagged packet 550 in FIG. 5B are used, and the IP address within the inner IP header 176 is swapped with the MAC address within the outer MAC header 172. The MAC header 172 can be part of an Ethernet frame header. The Ethertype field within the outer Ethernet frame header (e.g., which originally included the MAC header) is then encoded with an unassigned value (UV) to identify the swap information so that the egress processing circuitry can swap back the values to the original state.

TABLE 3

EXAMPLE FIELD SWAP INDICATORS

| Ethertype value | Swap | Prior Value |
|---|---|---|
| UV-1 | IP address from inner IP header swapped with MAC address in outer MAC header | Ethertype value was 0x8847 |
| UV-2 | IP address from inner IP header swapped with MAC address in outer MAC header | Ethertype value was 0x8848 |

Figure 5C:
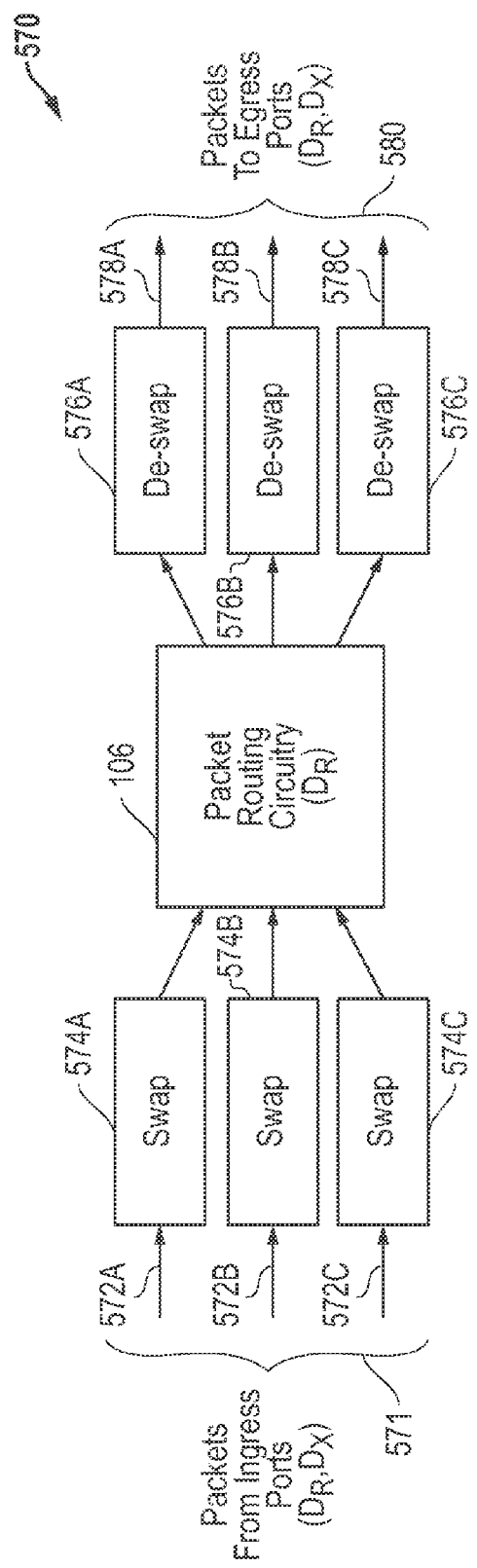
FIG. 5C is a block diagram for an embodiment of a system for processing packets that utilizes data swapping as packet modifications.

FIG. 5C is a block diagram for an embodiment 570 that utilizes swapping to allow packets to be processed using data ($D_X$) that is traditionally unrecognized by the packet routing circuitry 106 for packet classification and forwarding purposes. As depicted, packets 571 from ingress ports 111 on the NTO device 202, which can include both recognized data ($D_R$) and unrecognized data ($D_X$), are received by swap blocks 574A, 574B, and 574C. In particular, the packet streams 592A, 592B, and 592C from respective ingress ports are received by swap blocks 574A, 574B, and 574C before being provided to packet routing circuitry 106. As described above, packet routing circuitry 106 is configured to recognize only data ($D_R$) in certain portions of the input packets 571 for packet processing, depending upon the protocols used to format those packets. For packets having unrecognized data ($D_X$) that is desired to be used for packet classification and forwarding, the swap blocks 574A, 574B, and 574C swap inner header and/or field information for outer header and/or field information to form packets that can be processed, classified, and forwarded by the packet routing circuitry 106 according to the originally unrecognized data ($D_X$). The processed packets are then forwarded to the appropriate egress ports 119 for the NTO device 202. As depicted the de-swap blocks 576A, 576B, and 576C receive packets from the packet routing circuitry 106 and de-swap the swapped information within these packets to reform the original packets. These original packets are then provided as packet streams 578A, 578B, and 578C to respective egress ports 119. Advantageously, these reformed packets 580 that are provided to one or more egress ports include the recognized data ($D_R$) and unrecognized data ($D_X$) in there original locations within the reformed packets.

Figure 6A:
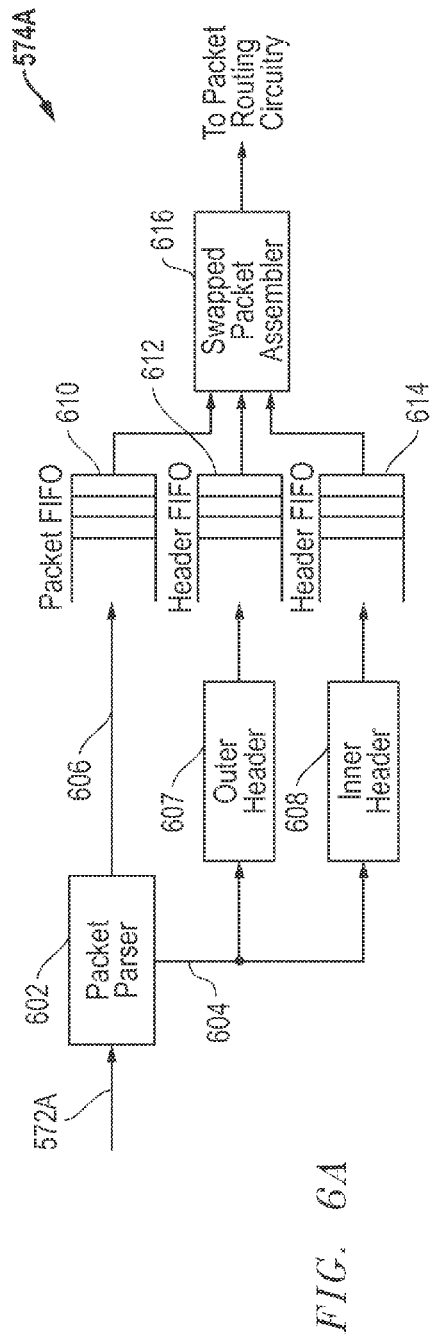
FIG. 6A is an example embodiment of swap circuitry that forms swapped packets.

FIG. 6A provides an example embodiment for a swap block 574A that can be utilized to swap header and/or field information within a packet. The incoming packets 572A are first sent to a packet parser 602 that can process the packets according to the protocols with which they are formatted. For packets having unrecognized data ($D_X$) that is desired to be used for packet classification and forwarding, the packet parser 602 extracts information 604 from the headers that will be used for the swap. The outer header information 607 to be used from the outer headers is provided to header FIFO 612, where it is stored. The inner header information 608 to be used from the inner headers is provided to header FIFO 614, where it is stored. The original packets 606 are provided to packet FIFO 610, where they are stored. The swapped packet assembler 616 then receives the original packets from the packet FIFO buffer 610, receives the outer header/field swap data from the header FIFO 612, receives the inner header/field swap data from the header FIFO 614, assembles the swapped packets, and outputs the swapped packets to the packet routing circuitry. For packets that do not have unrecognized data ($D_X$) that is to be swapped, the packet assembler 616 simply outputs the original packet from the packet FIFO 610 to the packet routing circuitry.

Figure 6B:
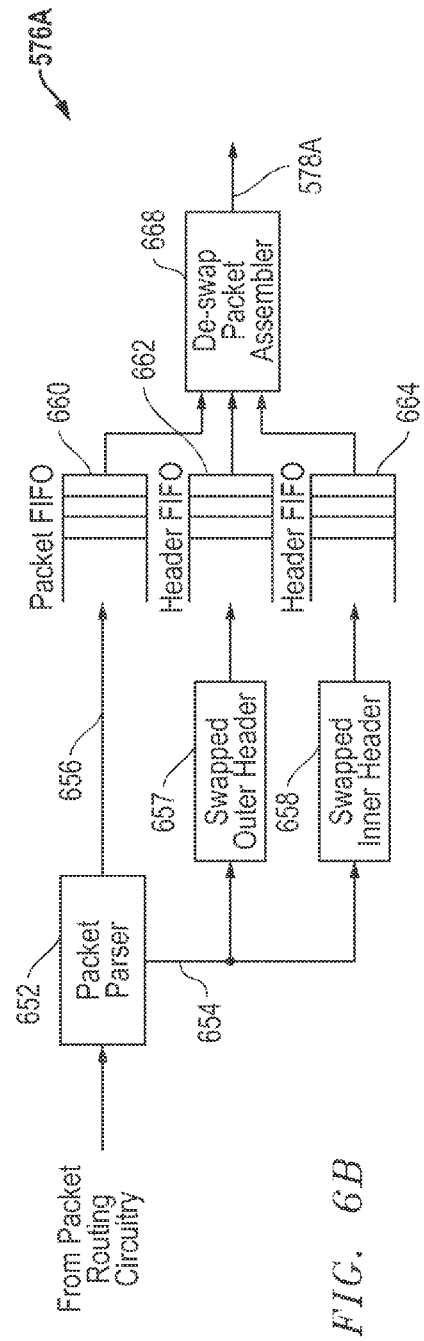
FIG. 6B is an example embodiment of de-swap circuitry that swaps back the swapped information to reform original packets.

FIG. 6B provides an example embodiment for a de-swap block 576A that can be used to de-swap the swapped data within the packet. Packets from the packet routing circuitry are received by the packet parser 652. The packet parser 652 determines if each packet has been swapped. For packets having swapped data, the packet parser 652 extracts information 654 from the headers that were used for the swap. The swapped outer header information 657 used from the outer headers is provided to header FIFO 662, where it is stored. The swapped inner header information 658 used from the inner headers is provided to header FIFO 664, where it is stored. The processed packets from the packet routing circuitry 106 are also provided as packets 656 to packet FIFO 660, where they are stored. The de-swap packet assembler 668 then receives the processed packets from the packet FIFO buffer 660, receives the outer header swap data from the header FIFO 662, receives the inner header swap data from the header FIFO 664, assembles the de-swapped packet, and outputs the de-swapped and reformed packet to the appropriate egress ports 119. For packets that do not have unrecognized data ($D_X$) that has been swapped, the packet assembler 668 simply outputs the processed packet to the packet routing circuitry.

As noted above with respect to the insertion of data into additional encapsulation headers, unrecognized data that was not within the original input packet can also be swapped for data within the packet so that it can be recognized and used by the packet routing circuitry for packet classification and forwarding purposes. For example, certain fields that are not of interest within the input packet can be replaced with additional data not contained in the original packet. This additional data, which would have been unrecognized by the packet routing circuitry for packet classification and forwarding purposes, can be used by the packet routing circuitry once swapped into fields that are recognized by the packet routing circuitry. One example of swapping in data not within the original packet would be the insertion of the ingress port number for a packet into a VLAN field for the packet, assuming that changing the VLAN field value in the packet would be recognized by the packet routing circuitry. This swapping of the ingress port number into the packet would allow the packet routing circuitry to process, classify, and forward packets based upon the ingress port number. Other or different data that was not within the original input packet could also be swapped into the packet so that this unrecognized data becomes recognized data within the input packet, depending upon the capabilities of the packet routing circuitry utilized. Variations could also be implemented, as desired.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A packet processing device for classifying and forwarding network packets, comprising:
   one or more input ports configured to receive input packets from one or more external source devices;
   packet routing circuitry configured to process modified packets from packet modification circuitry based upon data within portions of the modified packets recognized for purposes of packet processing by the packet routing circuitry, to ignore data in portions of the modified packets not recognized for purposes of packet processing by the packet routing circuitry, and to forward the modified packets based upon packet classification and forwarding control information;
   packet modification circuitry configured to receive the input packets, to modify the input packets so that unrecognized data becomes data within recognized portions of the input packets for purposes of packet processing by the packet routing circuitry, and to provide the modified packets to the packet routing circuitry;
   packet de-modification circuitry configured to receive the modified packets from the packet routing circuitry, to remove modifications from the modified packets, and to output reformed packets;
   one or more output ports configured to receive the reformed packets and to provide the reformed packets as output packets to one or more external destination devices; and
   a packet processing controller configured to provide the packet classification and forwarding control information to the packet routing circuitry, to provide packet modification control information to the packet modification circuitry, and to provide packet de-modification control information to the packet de-modification circuitry, wherein the packet processing controller is configured to be accessed by an external user to allow user configuration of the packet classification and forwarding control information;
   wherein the packet modification circuitry is configured to modify the input packets by adding encapsulation headers to the input packets and to insert the unrecognized data into the encapsulation headers, the encapsulation headers becoming recognized portions of the input packets; and
   wherein the encapsulation headers comprise IP headers configured to hold data copied from unrecognized portions of the input packets.

2. The packet processing device of claim 1, wherein at least one field within the recognized portions of the input packets is configured to be used to identify whether or not an input packet has been modified.

3. The packet processing device of claim 2, wherein the packet modification circuitry is configured to apply one of a plurality of packet modifications and wherein at least one field within the recognized portions of the input packets is configured to be used to identity which one of the plurality of modifications was applied.

4. The packet processing device of claim 3, wherein one field within the recognized portions of the input packets is used to identify both whether or not an input packet has been modified and which one of the plurality of modifications was applied.

5. The packet processing device of claim 1, wherein the packet de-modification circuitry is configured to remove the encapsulation headers.

6. The packet processing device of claim 1, wherein the encapsulation headers further comprise TCP headers or UDP headers configured to hold data copied from unrecognized portions of the input packets.

7. A packet processing device for classifying and forwarding network packets, comprising:
   one or more input ports configured to receive input packets from one or more external source devices;
   packet routing circuitry configured to process modified packets based upon data within portions of the modified packets recognized for purposes of packet processing by the packet routing circuitry, to ignore data in portions of the modified packets not recognized for purposes of packet processing by the packet routing circuitry, and to forward the modified packets based upon packet classification and forwarding control information;
   packet modification circuitry configured to receive the input packets, to modify the input packets so that unrecognized data becomes data within recognized portions of the input packets for purposes of packet processing by the packet routing circuitry, and to provide the modified packets to the packet routing circuitry;
   packet de-modification circuitry configured to receive the modified packets from the packet routing circuitry, to remove modifications from the modified packets, and to output reformed packets;
   one or more output ports configured to receive the reformed packets and to provide the reformed packets as output packets to one or more external destination devices; and
   a packet processing controller configured to provide the packet classification and forwarding control information to the packet routing circuitry, to provide packet modification control information to the packet modification circuitry, and to provide packet de-modification control information to the packet de-modification circuitry, wherein the packet processing controller is configured to be accessed by an external user to allow user configuration of the packet classification and forwarding control information;
   wherein the packet modification circuitry is configured to modify the input packets by swapping the unrecognized data with data from recognized portions of the input packets;
   wherein the swapped data comprises IP addresses from unrecognized portions of the input packets.

8. The packet processing device of claim 7, wherein the packet de-modification circuitry is configured to swap back the swapped data.

9. The packet processing device of claim 7, wherein the unrecognized data comprises data within unrecognized portions of the input packets for purposes of packet processing by the packet routing circuitry, and wherein a number of bits swapped from the unrecognized portions are not equal to a number of bits used for swapping in the recognized portions.

10. The packet processing device of claim 7, wherein the IP addresses are swapped into MAC headers in the recognized portions of the input packets.

11. The packet processing device of claim 7, wherein at least one field within the recognized portions of the input packets is configured to be used to identify whether or not an input packet has been modified.

12. The packet processing device of claim 11, wherein the packet modification circuitry is configured to apply one of a plurality of packet modifications and wherein at least one field within the recognized portions of the input packets is configured to be used to identity which one of the plurality of modifications was applied.

13. The packet processing device of claim 12, wherein one field within the recognized portions of the input packets is used to identify both whether or not an input packet has been modified and which one of the plurality of modifications was applied.

14. A method for processing network packets for classification and forwarding, comprising:
receiving input packets from one or more external source devices at one or more input ports for a packet processing device;
modifying the input packets so that unrecognized data becomes data within recognized portions of the input packets for purposes of packet classifying within the packet processing device;
classifying the modified packets based upon data within the recognized portions of the modified packets and not upon data within unrecognized portions of the modified packets;
forwarding the modified packets based upon packet classification;
removing modifications from the modified packets to generate reformed packets;
outputting the reformed packets to one or more external destination devices through one or more output ports for the packet processing device;
utilizing packet processing controller to provide packet classification and forwarding control information for the classifying and forwarding steps, to provide packet modification control information for the modifying step, and to provide packet de-modification control information for the removing step; and
allowing an external user to configure the packet classification and forwarding control information;
wherein the modifying step comprises adding encapsulation headers to the input packets so that the encapsulation headers become recognized portions of the input packets and inserting the unrecognized data into the encapsulation headers; and
wherein the modifying step comprises including IP headers within the encapsulation headers and inserting data from unrecognized portions of the input packets into the IP headers.

15. The method of claim 14, further comprising using at least one field within the recognized portions of the input packets identifies whether or not an input packet has been modified.

16. The method of claim 15, wherein the modifying step applies one of a plurality of packet modifications and wherein at least one field within the recognized portions of the input packets identities which one of the plurality of modifications was applied.

17. The method of claim 16, further comprising using a single field within the recognized portions of the input packets to identify both whether or not an input packet has been modified and which one of the plurality of modifications was applied.

18. The method of claim 14, wherein the removing step comprises removing the encapsulation headers.

19. The method of claim 14, further comprising including TCP headers or UDP headers within the encapsulation headers and inserting data from unrecognized portions of the input packets into the TCP headers or the UDP headers.

20. A method for processing network packets for classification and forwarding, comprising:
receiving input packets from one or more external source devices at one or more input ports for a packet processing device;
modifying the input packets so that unrecognized data becomes data within recognized portions of the input packets for purposes of packet classifying within the packet processing device;
classifying the modified packets based upon data within the recognized portions of the modified packets and not upon data within unrecognized portions of the modified packets;
forwarding the modified packets based upon packet classification;
removing modifications from the modified packets to generate reformed packets; and
outputting the reformed packets to one or more external destination devices through one or more output ports for the packet processing device;
utilizing a packet processing controller to provide packet classification and forwarding control information for the classifying and forwarding steps, to provide packet modification control information for the modifying step, and to provide packet de-modification control information for the removing step; and
allowing an external user to configure the packet classification and forwarding control information;
wherein the modifying step comprises swapping unrecognized data with data from recognized portions of the input packets; and
wherein the swapping step comprises swapping IP addresses from unrecognized portions of the input packets into recognized portions of the input packets.

21. The method of claim 20, wherein the removing step comprises swapping back the swapped data.

22. The method of claim 20, wherein the unrecognized data comprises data within unrecognized portions of the input packets for purposes of packet classifying within the packet processing device, and wherein a number of bits swapped from the unrecognized portions are not equal to a number of bits used for swapping in the recognized portions.

23. The method of claim 20, wherein the IP address are swapped into MAC headers in recognized portions of the input packets.

24. The method of claim 20, further comprising using at least one field within the recognized portions of the input packets identifies whether or not an input packet has been modified.

25. The method of claim 24, wherein the modifying step applies one of a plurality of packet modifications and wherein at least one field within the recognized portions of the input packets identities which one of the plurality of modifications was applied.

26. The method of claim 25, further comprising using a single field within the recognized portions of the input packets to identify both whether or not an input packet has been modified and which one of the plurality of modifications was applied.

27. A packet processing device, comprising:
- a plurality of input ports configured to receive input packets from external source devices;
- at least one packet switch integrated circuit having encapsulated packets as inputs and having routed packets as outputs, the packet switch being configured to forward the encapsulated packets at least in part based upon encapsulation header data;
- programmable integrated circuitry comprising at least one of a field programmable gate array (FPGA) or an application specific integrated circuit (ASIC) configured to provide:
  - a plurality of encapsulation blocks coupled to the plurality of input ports and having the encapsulated packets as outputs, the encapsulated packets comprising additional encapsulation header data as compared to the input packets; and
  - a plurality of de-encapsulation blocks having the routed packets as inputs and having de-encapsulated packets as outputs, the de-encapsulated packets having the additional encapsulation header data removed;
- a plurality of output ports configured to receive the de-encapsulated packets as inputs and to provide output packets to at least one external destination device; and
- a packet processing controller configured to provide the packet classification and forwarding control information to the packet switch integrated circuit, to provide packet encapsulation control information to the encapsulation blocks, and to provide packet de-encapsulation control information to the de-encapsulation blocks, wherein the packet processing controller is configured to be accessed by an external user to allow user configuration of the packet classification and forwarding control information;
- wherein the encapsulation header data comprises IP headers configured to hold data copied from unrecognized portions of the input packets.

28. A packet processing device, comprising:
- a plurality of input ports configured to receive input packets from external source devices;
- at least one packet switch integrated circuit having encapsulated packets as inputs and having routed packets as outputs, the packet switch being configured to forward the encapsulated packets at least in part based upon encapsulation header data;
- processing circuitry comprising at least one of a CPU, controller, microcontroller, processor, or microprocessor configured to execute computer readable instructions embodied in a non-transitory tangible medium to provide:
  - a plurality of encapsulation blocks coupled to the plurality of input ports and having the encapsulated packets as outputs, the encapsulated packets comprising additional encapsulation header data as compared to the input packets; and
  - a plurality of de-encapsulation blocks having the routed packets as inputs and having de-encapsulated packets as outputs, the de-encapsulated packets having the additional encapsulation header data removed;
- a plurality of output ports configured to receive the de-encapsulated packets as inputs and to provide output packets to at least one external destination device; and
- a packet processing controller configured to provide the packet classification and forwarding control information to the packet switch integrated circuit, to provide packet encapsulation control information to the encapsulation blocks, and to provide packet de-encapsulation control information to the de-encapsulation blocks, wherein the packet processing controller is configured to be accessed by an external user to allow user configuration of the packet classification and forwarding control information;
- wherein the encapsulation header data comprises IP headers configured to hold data copied from unrecognized portions of the input packets.

29. A packet processing device, comprising:
- a plurality of input ports configured to receive input packets from external source devices;
- at least one packet switch integrated circuit having swapped packets as inputs and having routed packets as outputs, the packet switch being configured to forward the swapped packets at least in part based upon encapsulation header data;
- programmable integrated circuitry comprising at least one of a field programmable gate array (FPGA) or an application specific integrated circuit (ASIC) configured to provide:
  - a plurality of swap blocks coupled to the plurality of input ports and having the swapped packets as outputs, the swapped packets comprising header data swapped from at least one original location within the input packets; and
  - a plurality of de-swap blocks having the routed packets as inputs and having de-swapped packets as outputs, the de-swapped packets having header data swapped back to the original location within the input packets; and
- a plurality of output ports configured to receive the de-encapsulated packets as inputs and to provide output packets to at least one external destination device; and
- a packet processing controller configured to provide the packet classification and forwarding control information to the packet switch integrated circuit, to provide packet swap control information to the swap blocks, and to provide packet de-swap control information to the de-swap blocks, wherein the packet processing controller is configured to be accessed by an external user to allow user configuration of the packet classification and forwarding control information;
- wherein the swapped data comprises IP addresses from unrecognized portions of the input packets.

30. A packet processing device, comprising:
- a plurality of input ports configured to receive input packets from external source devices;
- at least one packet switch integrated circuit having swapped packets as inputs and having routed packets as outputs, the packet switch being configured to forward the swapped packets at least in part based upon encapsulation header data;
- processing circuitry comprising at least one of a CPU, controller, microcontroller, processor, or microprocessor configured to execute computer readable instructions embodied in a non-transitory tangible medium to provide:
  - a plurality of swap blocks coupled to the plurality of input ports and having the swapped packets as outputs, the swapped packets comprising header data swapped from at least one original location within the input packets; and
a plurality of de-swap blocks having the routed packets as inputs and having de-swapped packets as outputs, the de-swapped packets having header data swapped back to the original location within the input packets;
a plurality of output ports configured to receive the de-encapsulated packets as inputs and to provide output packets to at least one external destination device; and
a packet processing controller configured to provide the packet classification and forwarding control information to the packet switch integrated circuit, to provide packet swap control information to the swap blocks, and to provide packet de-swap control information to the de-swap blocks, wherein the packet processing controller is configured to be accessed by an external user to allow user configuration of the packet classification and forwarding control information;
wherein the swapped data comprises IP addresses from unrecognized portions of the input packets.

* * * * *